United States Patent [19]

Freimuth

[11] 4,009,645
[45] Mar. 1, 1977

[54] PISTON PUMP
[75] Inventor: Gerhart William Freimuth, Flemington, N.J.
[73] Assignee: Gerhart Engineering and Machine Company, Somerville, N.J.
[22] Filed: Nov. 3, 1975
[21] Appl. No.: 628,349
[52] U.S. Cl. .................................. 92/202; 92/249
[51] Int. Cl.² ........................................ F16J 1/06
[58] Field of Search ............ 92/202, 205, 240, 249, 92/201, 203, 206; 128/234, DIG. 14

[56] References Cited
UNITED STATES PATENTS

| | | | |
|---|---|---|---|
| 1,372,262 | 3/1921 | Yount | 92/258 X |
| 1,482,734 | 2/1924 | Carrow | 92/206 |
| 1,955,157 | 4/1934 | Wayne | 92/205 |
| 3,166,991 | 1/1965 | Blenkle | 92/249 X |
| 3,396,637 | 8/1968 | Sessody | 92/249 X |
| 3,747,479 | 7/1973 | Nightingale et al. | 92/202 |

Primary Examiner—Irwin C. Cohen

[57] ABSTRACT

A piston pump comprising a cylindrical sleeve member, a tetrafluoroethylene plunger head contained within the sleeve member, at least one O-ring contained within a circular recess concentric with and extending axially from the lower transverse face of and into the plunger head, and a piston rod having one end concentric with and rigidly mounted to this lower transverse face. Also, a pressure cap having a cylindrical uppermost portion dimensioned to fit into the circular recess of the plunger head, is adjustably mounted upon the piston rod, for axially compressing the O-ring(s), causing the O-ring(s) to exert a radial force against and effect a seal of a portion of the circular side walls of the plunger head against the opposing interior wall of the sleeve.

4 Claims, 2 Drawing Figures

PISTON PUMP

This invention relates generally to piston pumps, and more specifically to an adjustable sealing assembly including and permitting the use of a tetrafluoroethylene plunger head.

In many industries where a product must be transported by piston pump mechanisms, it is imperative that the pump mechanism not contaminate, impart impurities to, or react with the product being pumped or dispensed. Such industries, for example, include the drug and food industries.

To provide such a non-contaminating and substantially chemically inert pump assembly, stainless steel and tetrafluoroethylene are one combination of materials that are applicable for use in such pump assemblies. Accordingly, prior art pump assemblies have included stainless steel plunger heads with tetrafluoroethylene or other material as O-ring seals. Such assemblies have proven to be unreliable in that the tetrafluoroethylene is material which cold flows, and O-rings in general tend to breakdown and distort, further causing contamination of the product by portions of the O-ring breaking off and entering the product mix, and causing a loss in sealing efficiency.

Other attempts in the prior art to apply tetrafluoroethylene as a sealing material, includes the use of such material in "chevron" seals in piston pumps. This type of seal has also proven to be unreliable, in that the edges of the "chevron" seal members tend to deteriorate causing tetrafluoroethylene slivers to enter and contaminate the product. In addition, such a seal requires a large plurality of parts. There are also many crevices for product to leak into, if the chevron seal deteriorates. An example of a chevron seal having rubber and leather V-rings can be found in Pfauser U.S. Pat. No. 2,188,957.

To substantially overcome these and other problems in the prior art, the subject piston pump includes a tetrafluoroethylene plunger head having a circular recess extending axially from its lower transverse face for containing resilient material. A piston rod is rigidly mounted to this transverse face. A pressure cap is adjustably mounted upon the piston rod, for axially compressing the resilient material, causing the resilient material to exert a radial force against and effect a seal of a portion of the circular side walls of the plunger head against the interior wall of the cylindrical sleeve containing the plunger head.

Figure 1:
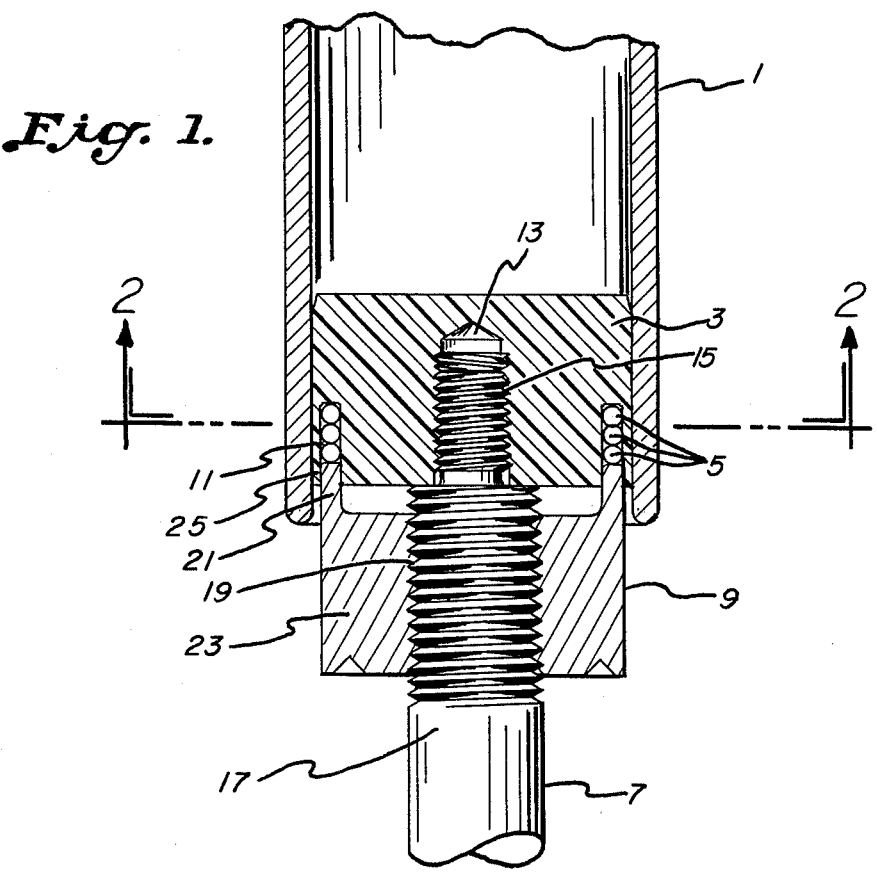
FIG. 1 is a partial view in axial cross section of the piston pump.
Figure 2:
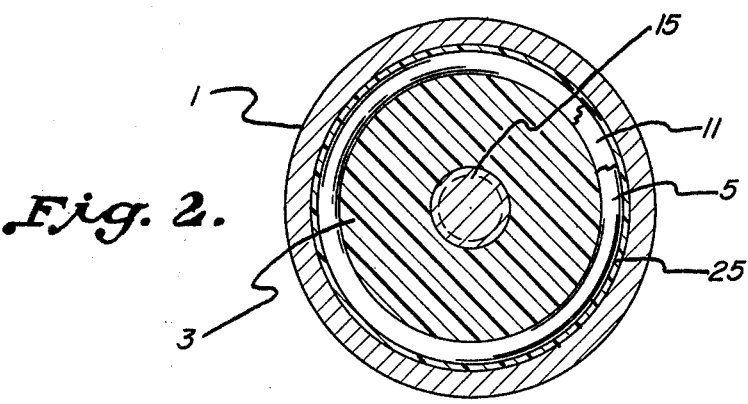
FIG. 2 is a cross-sectional view of the plunger head taken on the line 2—2 of FIG. 1, looking in the direction of the arrows.

The piston pump includes a sleeve 1, a plunger head 3, resilient material or at least one O-ring 5, a piston rod 7, and a pressure cap 9 (see FIGS. 1 and 2).

As shown, the sleeve 1 is cylindrical and contains the piston like plunger head 3. The lower transverse face of the plunger head 3 has a circular aperture or recess 11 radial or concentric with and extending axially from this face into a portion of the plunger head 3. A threaded hole 13 is centrally located upon this transverse face and extends axially into a portion of the plunger head 3.

The piston rod 7 has a threaded reduced end 15 for mating with the hole 13 of plunger head 3. As shown, the piston rod 7 is screwed into the plunger head 3 until the shoulder formed at the junction of the unreduced end 17 and the reduced end 15 is abutted against the lower transverse face of the plunger head 3. The uppermost portion of the unreduced end 19 is threaded.

At least one O-ring 5 is mounted within the circular aperture or recess 11 of the plunger head 3. Alternatively, a plurality of O-rings can be mounted successively therein, in a preferred embodiment. Another alternative is to pack the recess 11 with suitable resilient material.

The pressure cap 9 has a cylindrical like upper portion or end 21 dimensioned to fit within the circular recess 11 of the plunger head 3, and a more solid lower portion 23 having a centrally located threaded hole run axially therethrough. This threaded hole is for mating with the threaded portion 19 of the unreduced portion 17 of piston rod 7.

It should be noted that the plunger head 3 can be fabricated from any one of a number of suitable resilient materials, and in the preferred embodiment is fabricated from tetrafluoroethylene. As previously mentioned, tetrafluoroethylene is preferred in many applications because of its chemical inertness, and its low coefficient of friction. Although other materials may be suitable, stainless steel is the preferred material for the sleeve 1, plunger head 3, and piston rod 7.

The pressure cap 9 is screwed onto the threaded portion 19 of piston rod 7, as shown, prior to screwing the reduced end of the rod 7 into the plunger head 3. Of course, the O-ring 5, or O-rings 5, or resilient material 5 have been installed in the circular recess 11 of plunger head 3, prior to any assembly taking place. The plunger head 3 is inserted into the sleeve 1, as shown, and the pressure cap is then turned in such direction to move the cap 9 closer to the plunger head 3. As the cap 9 is so turned, its cylindrical end 21 will begin to apply an even and increasingly greater continuous axial pressure upon the O-rings 5. Such pressure will cause the O-rings 5 to deform in the radial direction of the plunger head 3, and exert an increasingly greater radial force against the adjacent outer wall portions 25 forming the recess 11 of plunger head 3. The pressure cap 9 is so turned until these outer wall portions 25 of plunger head 3 "seal" against the interior wall of the sleeve 1.

Once the seal is so effected, the resilient material or O-rings 5, while being axially compressed, will automatically compensate or self adjust for a range of wear and cold flow, if any, of the material of the plunger head 3, to retain the seal. Outside of this range, the pressure cap must be turned to increase the axial force applied to the O-rings 5, for re-effecting the seal.

With the seal intact, the piston rod 7 can be moved up or down, for forcing a product out of or permitting a product to enter the interior of the sleeve 1 above the plunger head 3, through the use of valving or other means which are not shown. If the seal is broken for some reason, it is important to observe that the design is such that the product cannot normally leak into the expanding elements 5 or recess 11. Accordingly, maintainability of the pump system is enhanced.

The plunger head 3 can also be fabricated by coating or bonding an end of a piston rod with a material such as, for example, tetrafluoroethylene. Machining could then be accomplished to obtain the same plunger head 3 configuration as shown in FIG. 1.

Although this invention has been described with particular reference to preferred embodiments, it is not intended to limit the scope of the invention to the embodiments illustrated, nor otherwise than by the terms of the subjoined claims.

What is claimed is:
1. A piston pump comprising:
   a cylindrical sleeve member having an interior cylindrical wall;
   a plunger head of resilient material having an outside diameter of such dimension to permit said plunger head to be slidable within and guided by the interior wall of said cylindrical sleeve member, an upper transverse face and a lower transverse face, a longitudinal circular aperture radial with and extending axially from said lower transverse face into said plunger head, and a hole centrally located upon and extending axially from said lower transverse face into said plunger head;
   a piston rod having an end mounted within said hole of and rigidly connected to said plunger head, and a threaded portion immediately adjacent thereto;
   resilient material means contained within said circular aperture; and
   a cylindrical pressure cap having an uppermost cylindrical end portion dimensioned to be slidably engaged in said circular aperture of said plunger head, and a lowermost solid bar-like portion with a centrally located threaded axial hole for mounting upon said threaded portion of said piston rod below said plunger head, thereby permitting the pressure cap to be selectively manually turned for positioning said cap without removing the plunger head from said cylindrical sleeve to apply even and continuous pressure upon said resilient material means, expanding said resilient material means to force the adjacent portions of said plunger head to "seal" against the interior wall of said sleeve member, preventing the escape of a product contained within said sleeve member above said plunger head.

2. The piston pump of claim 1, wherein said resilient material of said plunger head is tetrafluoroethylene.

3. The piston pump of claim 1, wherein said resilient material means includes at least one O-ring mounted within said circular recess of said plunger head.

4. The piston pump of claim 1, wherein said resilient material means includes a plurality of O-rings mounted successively within said circular recess of said plunger head.

* * * * *